United States Patent
Langton et al.

(10) Patent No.: US 9,654,496 B1
(45) Date of Patent: May 16, 2017

(54) OBTAINING SUSPECT OBJECTS BASED ON DETECTING SUSPICIOUS ACTIVITY

(71) Applicant: Juniper Networks, Inc., Sunnyvale, CA (US)

(72) Inventors: Jacob Asher Langton, Oakland, CA (US); Daniel J. Quinlan, San Francisco, CA (US); Kyle Adams, Brisbane, CA (US); Zhenxin Zhan, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 14/674,269

(22) Filed: Mar. 31, 2015

(51) Int. Cl.
*G06F 11/00* (2006.01)
*G06F 12/14* (2006.01)
*G06F 12/16* (2006.01)
*G08B 23/00* (2006.01)
*H04L 29/06* (2006.01)
*G06F 21/56* (2013.01)

(52) U.S. Cl.
CPC ............ *H04L 63/145* (2013.01); *G06F 21/56* (2013.01); *G06F 21/567* (2013.01); *H04L 63/1408* (2013.01); *G06F 2221/034* (2013.01)

(58) Field of Classification Search
CPC ........................................ G06F 21/50–21/568
USPC .................................................... 726/22–25
See application file for complete search history.

(56) References Cited

U.S. PATENT DOCUMENTS

| 8,590,045 B2* | 11/2013 | Niemela | G06F 21/566 |
| | | | 726/24 |
| 8,667,583 B2* | 3/2014 | Polyakov | G06F 21/552 |
| | | | 726/22 |
| 9,147,071 B2* | 9/2015 | Sallam | G06F 21/564 |
| 2002/0103783 A1* | 8/2002 | Muhlestein | G06F 21/562 |
| 2002/0194489 A1* | 12/2002 | Almogy | G06F 21/554 |
| | | | 726/24 |
| 2005/0050378 A1* | 3/2005 | Liang | G06F 21/56 |
| | | | 714/4.11 |
| 2007/0271616 A1* | 11/2007 | Jung | H04L 63/145 |
| | | | 726/24 |
| 2012/0110174 A1* | 5/2012 | Wootton | G06F 21/564 |
| | | | 709/224 |
| 2014/0096252 A1* | 4/2014 | Dalcher | H04L 63/1425 |
| | | | 726/23 |
| 2015/0067862 A1* | 3/2015 | Yu | H04L 63/145 |
| | | | 726/24 |

* cited by examiner

*Primary Examiner* — Michael R Vaughan
*Assistant Examiner* — Vadim Savenkov
(74) *Attorney, Agent, or Firm* — Harrity & Harrity, LLP

(57) ABSTRACT

A device may detect a suspicious activity. The device may automatically obtain a suspect object from a client device that is associated with the suspicious activity and based on detecting the suspicious activity. The suspect object may be an object that is possibly associated with the suspicious activity. The device may determine that the suspect object is malicious. The device may perform an action based on determining that the suspect object is malicious.

20 Claims, 8 Drawing Sheets

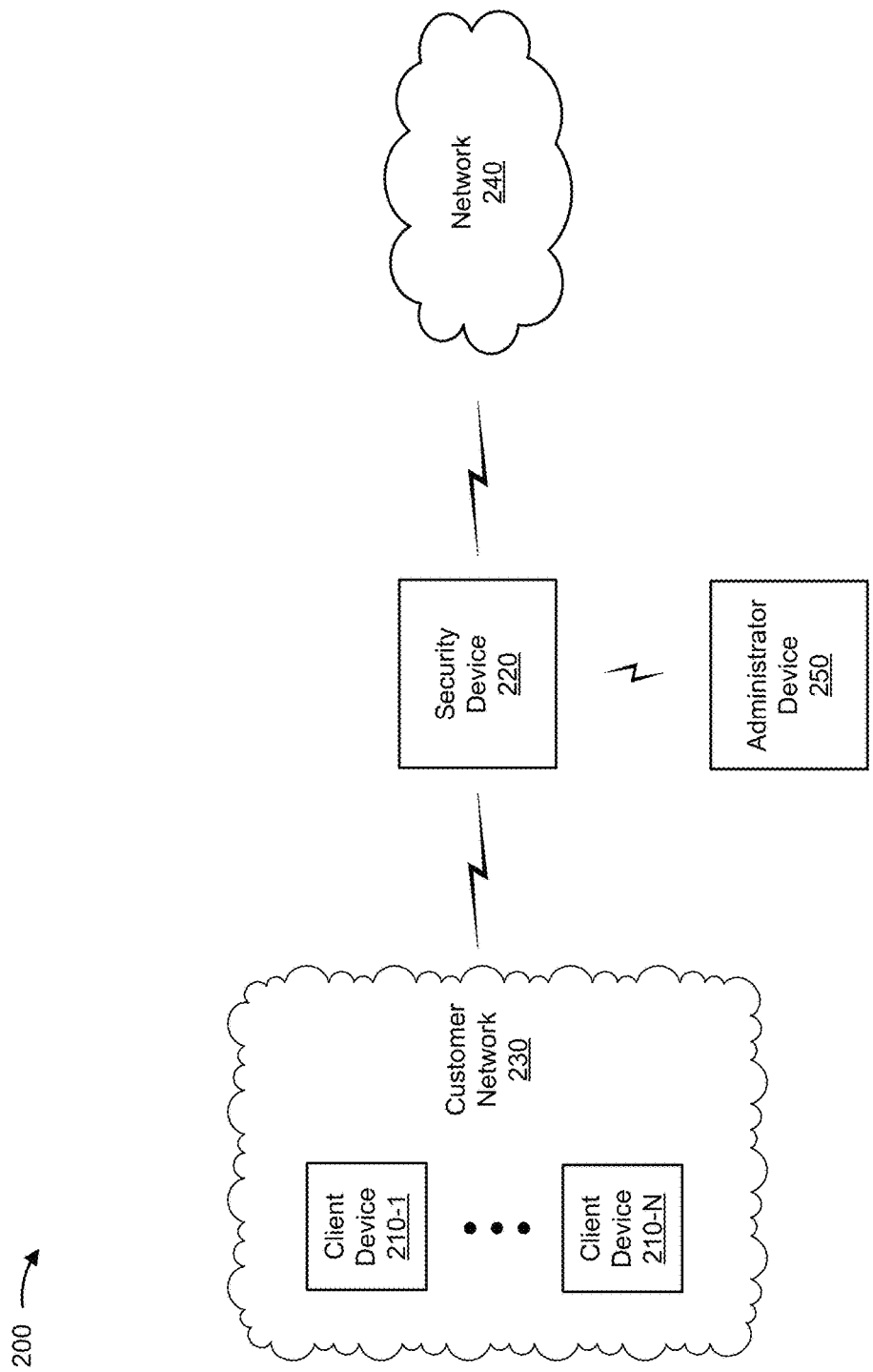

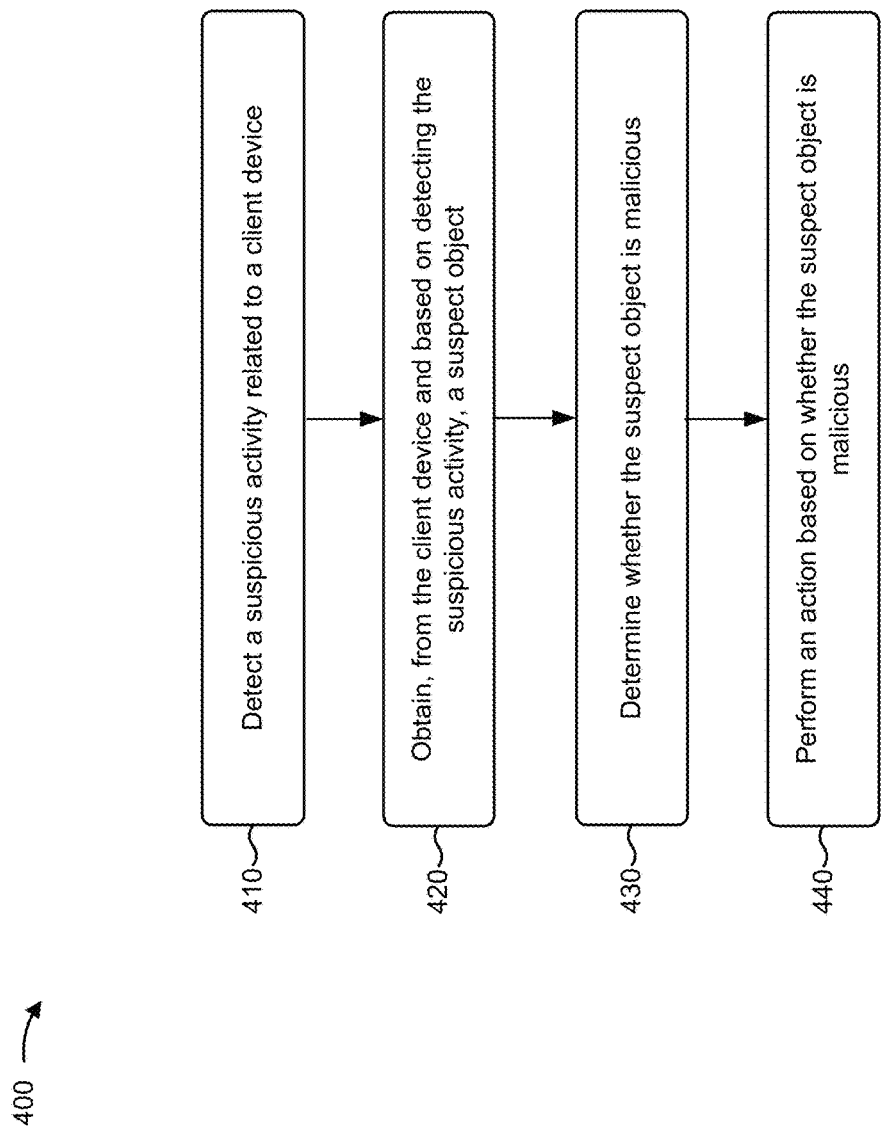

OBTAINING SUSPECT OBJECTS BASED ON DETECTING SUSPICIOUS ACTIVITY

BACKGROUND

A malicious file, such as malicious software ("malware"), may refer to any software used to disrupt computer operations, gather sensitive information, gain access to private computer systems, or the like. A malicious file may include a variety of types of hostile or intrusive software, including a computer virus, a worm, a Trojan horse, ransomware, spyware, adware, scareware, or other malicious software.

A client device on a customer network may download a file that is a malicious file during operation of the client device on the customer network or on another network. The file may be executed on and infect the client device before a security device analyzes the file. The file may also infect other client devices on the customer network.

SUMMARY

According to some possible implementations, a device may include one or more processors. The one or more processors may detect a suspicious activity. The one or more processors may automatically obtain a suspect object from a client device that is associated with the suspicious activity and based on detecting the suspicious activity. The suspect object may be an object that is possibly associated with the suspicious activity. The one or more processors may determine that the suspect object is malicious. The one or more processors may perform an action based on determining that the suspect object is malicious.

According to some possible implementations, a computer-readable medium may store one or more instructions that, when executed by one or more processors of a device, cause the one or more processors to detect a suspicious activity associated with a client device. The one or more instructions may cause the one or more processors to automatically obtain, from the client device and based on detecting the suspicious activity, one or more suspect objects. The one or more suspect objects may be objects that are capable of causing the suspicious activity. The one or more instructions may cause the one or more processors to determine that a suspect object, of the one or more suspect objects, is associated with the suspicious activity. The one or more instructions may cause the one or more processors to perform an action based on determining that the suspect object is associated with the suspicious activity.

According to some possible implementations, a method may include detecting, by a device, a suspicious activity. The method may include automatically obtaining, by the device and based on detecting the suspicious activity, a suspect object. The suspect object may be obtained from a client device that is associated with the suspicious activity, and may be an object that is possibly associated with the suspicious activity. The method may include determining, by the device, that the suspect object is malicious. The method may include performing, by the device, an action to remediate the suspect object based on determining that the suspect object is malicious.

BRIEF DESCRIPTION OF THE DRAWINGS

FIG. 2 is a diagram of an example environment in which systems and/or methods, described herein, may be implemented;

FIG. 4 is a flow chart of an example process for obtaining and/or testing suspect objects based on detecting suspicious activity.

DETAILED DESCRIPTION

The following detailed description of example implementations refers to the accompanying drawings. The same reference numbers in different drawings may identify the same or similar elements.

A security device may provide security services to client devices on a customer network. For example, the security device may detect suspicious activity, such as network traffic provided to or received from a malicious source and/or a malicious destination by the client devices, network port scanning performed by or related to the client devices, malicious requests from one of the client devices to another one of the client devices, an anomalous signal provided or received by one of the client devices, or the like. The suspicious activity may be caused by a suspect object executing on one or more of the client devices (e.g., a file, a computer program, program code, or the like, that may be from a malicious source). While some suspicious activities and suspect objects may be malicious, other suspicious activities and suspect objects may be non-malicious. For example, a non-malicious party may perform network port scanning for legitimate reasons.

A network administrator may need to ensure that the customer network is secure, and may accordingly test the suspect objects to determine whether the suspect objects are malicious. However, the network administrator may expend significant resources testing the suspect objects. For example, the network administrator may deploy an information technology agent to test the suspect objects, which may require significant time and money. Implementations described herein may enable the security device to obtain and/or test the suspect objects based on detecting the suspicious activity, which may reduce resources expended by the network administrator to obtain and/or test the suspect objects.

Figure 1A:
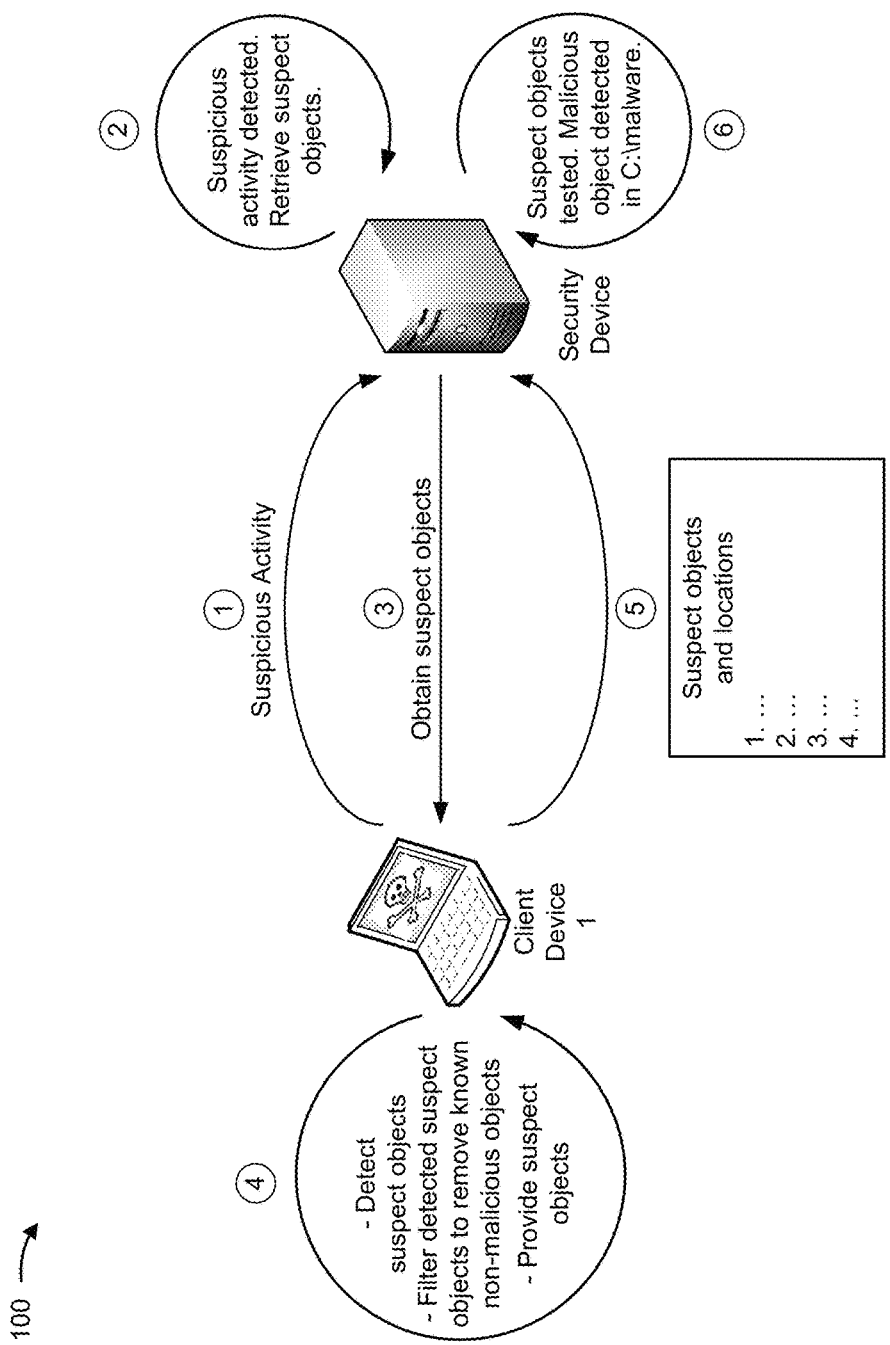
FIGS. 1A and 1B are diagrams of an overview of an example implementation described herein.
Figure 1B:
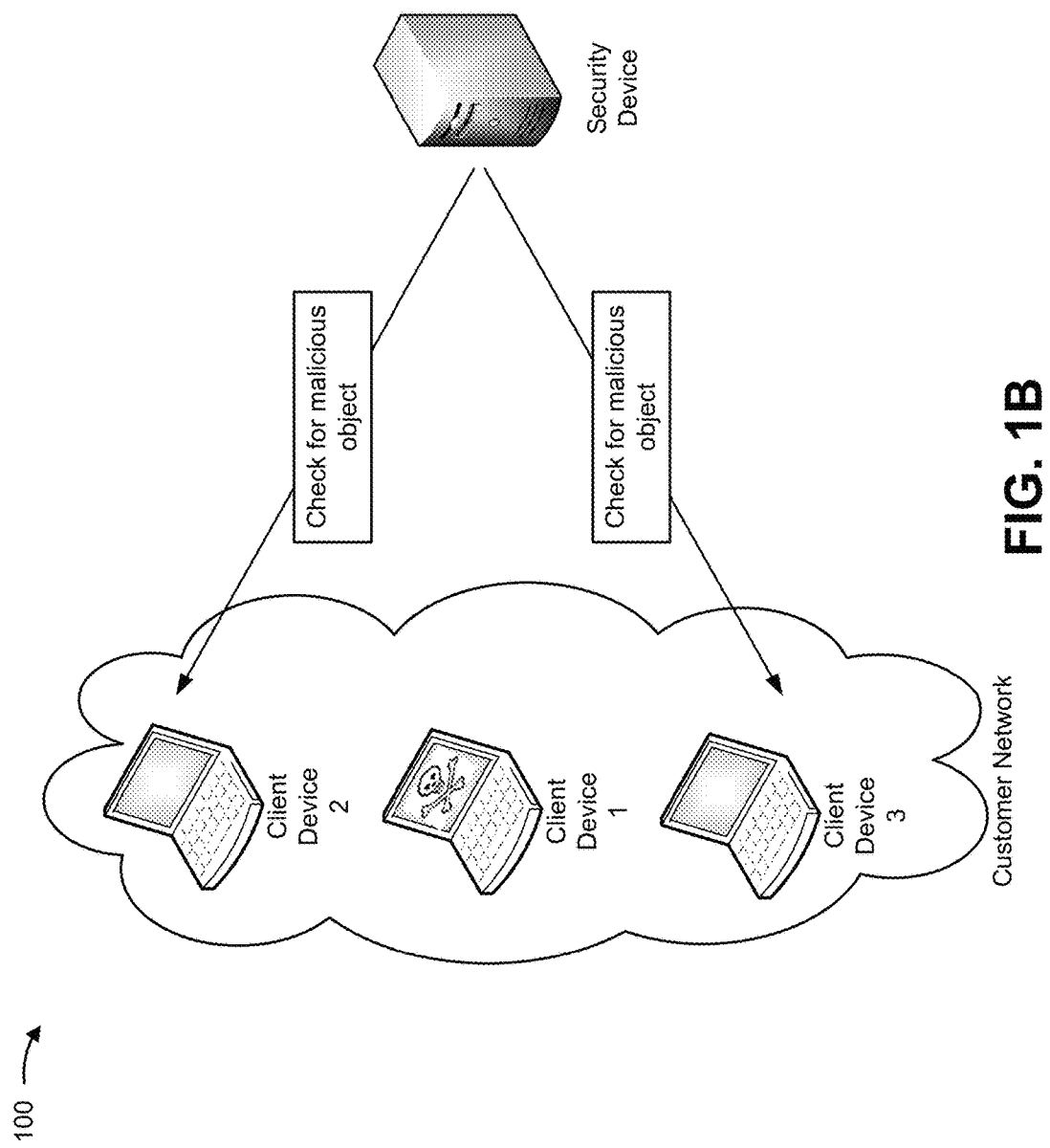

FIGS. 1A and 1B are diagrams of an overview of an example implementation 100 described herein. As shown in FIG. 1A, and by reference number 1, a client device (e.g., client device 1) may perform a suspicious activity. As shown by reference number 2, a security device may detect the suspicious activity. As shown by reference number 3, based on detecting the suspicious activity, the security device may obtain suspect objects from client device 1. As shown by reference number 4, the security device and/or client device 1 may determine the suspect objects. For example, the security device may use a remote management interface to determine the suspect objects, or may request the suspect objects from client device 1.

As further shown, the security device and/or client device 1 may filter suspect objects to remove known non-malicious objects. As shown by reference number 5, client device 1 may provide suspect objects, and identify locations associated with the suspect objects, to the security device. As shown by reference number 6, the security device may test the suspect objects to determine whether the suspect objects are malicious objects. As shown, assume that the security device determines that a malicious object of the suspect objects is associated with a location of C:\malware.

As shown in FIG. 1B, the security device may cause other client devices (e.g., client devices 2 and 3) on a customer network that includes client device 1 to search for a copy of the malicious object. Assume that the other client devices search for the malicious object locally on the other client devices. In this way, the security device may obtain suspect objects from a client device. The security device may test the suspect objects to determine whether the suspect objects are malicious and, in some implementations, may cause other client devices to search for a malicious object around a location of the malicious object on the client device. By obtaining and/or testing the suspect objects, the security device may reduce resources required by a network administrator, may improve security of a customer network, and may improve security of client devices.

FIG. 2 is a diagram of an example environment 200 in which systems and/or methods, described herein, may be implemented. As shown in FIG. 2, environment 200 may include one or more client devices 210-1 through 210-N (N≥1) (hereinafter referred to collectively as "client devices 210," and individually as "client device 210"), a security device 220, a customer network 230, a network 240, and an administrator device 250. Devices of environment 200 may interconnect via wired connections, wireless connections, or a combination of wired and wireless connections.

Client device 210 may include one or more devices capable of receiving, generating, storing, processing, and/or providing information. For example, client device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, client device 210 may be capable of executing a malicious file, which may cause harm to client device 210, information stored by client device 210, a user of client device 210, and/or another client device 210. In some implementations, Client device 210 may include a suspect object which may or may not be associated with a malicious file. In some implementations, another device (e.g., security device 220) may obtain and/or test the suspect object. In some implementations, client device 210 may interact with security device 220 via a remote management interface hosted by security device 220. In some implementations, client device 210 may reside on customer network 230.

Security device 220 may include one or more devices capable of processing and/or transferring network traffic associated with client device 210, and/or capable of monitoring network traffic for client device 210 and/or customer network 230. For example, security device 220 may include a gateway, a firewall, a router, a bridge, a hub, a switch, a load balancer, an access point, a reverse proxy, a server (e.g., a proxy server), or a similar type of device. Security device 220 may be used in connection with a single client device 210 or a group of client devices 210 (e.g., client devices 210 associated with a private network, a data center, etc.). In some implementations, communications may be routed through security device 220 to reach the group of client devices 210. Additionally, or alternatively, communications may be routed to security device 220 when the communications are directed toward client device 210.

In some implementations, security device 220 may detect a suspicious behavior relating to (e.g., originating from, destined to, associated with, etc.) client device 210, and may obtain suspect objects from client device 210 based on detecting the suspicious behavior. In some implementations, security device 220 may interact with client device 210 via a remote management interface (e.g., to obtain the suspect objects). Security device 220 may test the suspect objects to determine whether the one or more suspect objects are malicious. Security device 220 may take remedial actions based on determining that a suspect object is malicious.

Customer network 230 may include one or more wired and/or wireless networks. For example, customer network 230 may include a local area network (LAN), a private network, an intranet, a cloud computing network, a cellular network (e.g., a long-term evolution (LTE) network, a 3G network, a code division multiple access (CDMA) network, etc.), a public land mobile network (PLMN), a wide area network (WAN), a metropolitan area network (MAN), a telephone network (e.g., the Public Switched Telephone Network (PSTN)), an ad hoc network, the Internet, a fiber optic-based network, or the like, and/or a combination of these or other types of networks. In some implementations, customer network 230 may be a private network associated with client devices 210.

Network 240 may include one or more wired and/or wireless networks. For example, network 240 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Administrator device 250 may include one or more devices capable of performing monitoring for a network administrator, a system administrator, an IT agent, or the like. For example, administrator device 250 may include a computer, a server, a mobile device (e.g., a smartphone, a tablet computer, etc.), or the like. Administrator device 250 may receive information indicating that a malicious file is operating on a particular client device 210, and may cause an alert to be displayed for a user (e.g., the network administrator, the system administrator, the IT agent, etc.). In some implementations, administrator device 250 may cause a particular remediation action to be performed, may dispatch an IT agent to remediate a client device 210 on which the malicious file is operating, or the like.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
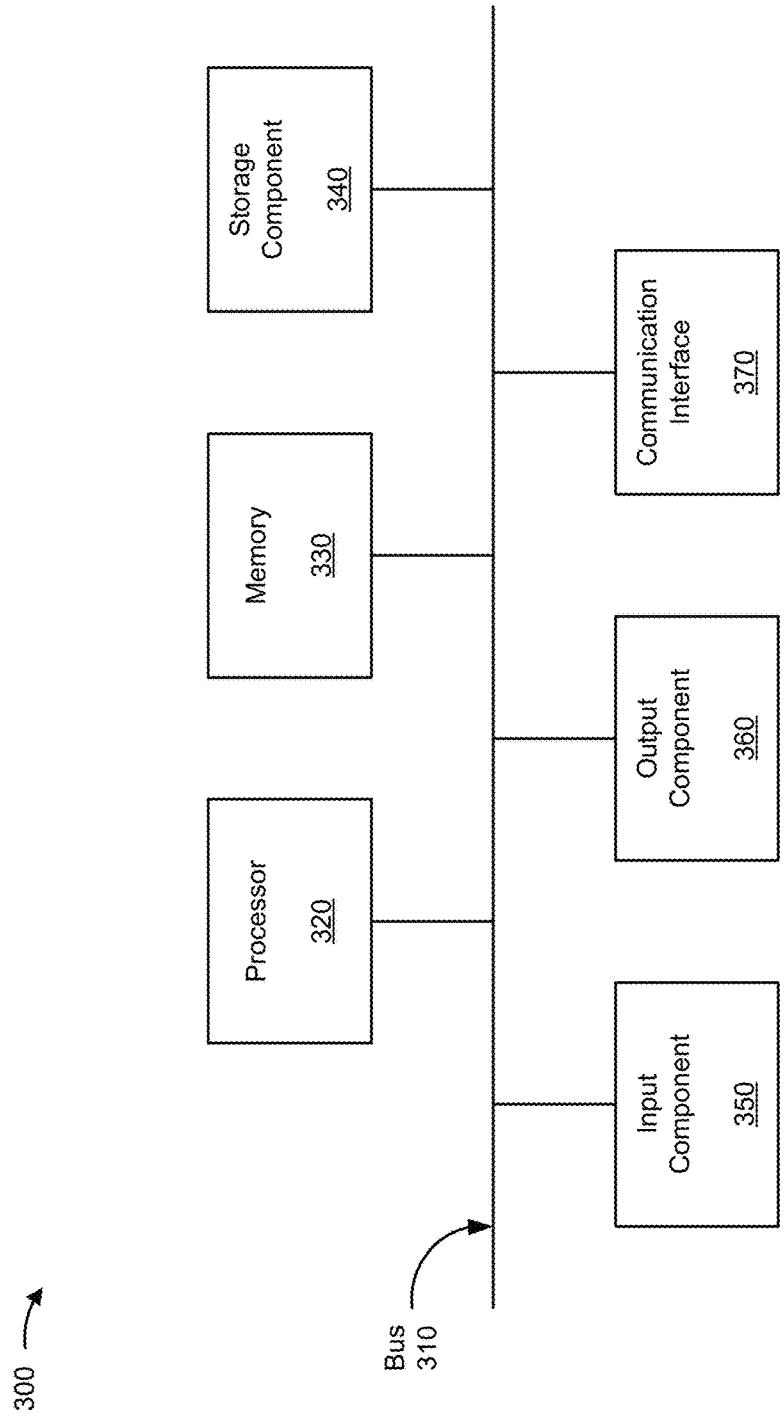
FIG. 3 is a diagram of example components of one or more devices of FIG. 2.

FIG. 3 is a diagram of example components of a device 300. Device 300 may correspond to client device 210, security device 220, and/or administrator device 250. In some implementations, client device 210, security device 220, and/or administrator device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for obtaining and/or testing suspect objects based on detecting suspicious activity. In some implementations, one or more process blocks of FIG. 4 may be performed by security device 220. In some implementations, one or more process blocks of FIG. 4 may be performed by another device or a set of devices separate from or including security device 220, such as client device 210 and/or administrator device 250.

As shown in FIG. 4, process 400 may include detecting a suspicious activity related to a client device (block 410). For example, security device 220 may detect a suspicious activity related to client device 210. The suspicious activity may, or may not, be associated with a malicious party, a malicious object, or the like. Based on detecting the suspicious activity, security device 220 may obtain suspect objects to determine, for example, whether client device 210 is compromised by the malicious party.

A suspicious activity may include a packet, a signal, an action, an interaction, or the like, originating from and/or related to client device 210. For example, a suspicious activity may include a malicious packet transmitted and/or received by client device 210, a communication by client device 210 with a malicious party, an attempt by client device 210 to maliciously interact with another client device 210, security device 220, or another device, a network port scan performed by client device 210, or the like. In some implementations, the suspicious activity may not be a malicious activity. For example, the suspicious activity may relate to accessing a previously un-accessed network service or a blocked webpage, transmitting a suspicious (e.g., previously unknown, disallowed, etc.) type of network traffic, running an unknown or untrusted application, or the like. In short, the suspicious activity may be a behavior that deviates from an expected behavior of client device 210.

In some implementations, client device 210 may perform the suspicious activity based on client device 210 being compromised by a malicious party. For example, client device 210 may connect to an unsecured network, and may be compromised by a malicious party while connected to the unsecured network. Client device 210 may subsequently connect to customer network 230, and may perform a suspicious activity as a result of being compromised. Security device 220 may detect the suspicious activity, may obtain suspect objects from client device 210, and may determine whether the suspect objects are malicious. In this way, security device 220 may ensure that a client device 210 that is compromised while connected to another network does not compromise devices on customer network 230.

In some implementations, security device 220 may detect the suspicious activity by monitoring client device 210, which may allow security device 220 to detect suspicious activities local to client device 210. Additionally, or alternatively, security device 220 may detect the suspicious activity based on receiving a packet, transmission, etc. provided by and/or destined for client device 210. For example, security device 220 may function as a gateway, a firewall, or the like, for client device 210, and may receive a packet en route to or from client device 210. In this way, security device 220 may improve security of client device 210 by detecting suspicious activities based on network traffic transmitted by and/or destined for client device 210. Additionally, or alternatively, security device 220 may detect an interaction and may determine that the interaction originates from client device 210. For example, security device 220 may detect a network port scanning request, a malicious interaction, or the like, from client device 210, and may determine that the scanning request, the malicious interaction, or the like, originates from client device 210.

In some implementations, the suspicious activity may not be malicious. For example, assume that a network administrator wants to prevent client device 210 from providing and/or receiving encrypted network traffic. In that case, a suspicious activity may include encrypting network traffic, providing encrypted network traffic, and/or receiving encrypted network traffic. Based on detecting the suspicious activity, security device 220 may obtain suspect objects, and may determine whether the suspect objects relate to encryption (e.g., may determine whether the suspect objects are encryption computer programs, encrypted files, security keys, etc.). Security device 220 may perform an action based on determining whether the suspect objects relate to encryption, such as notifying a network administrator (e.g., via administrator device 250), providing a warning to a user of client device 210, or the like. In this way, security device 220 may enforce rules not related to a malicious activity, which may improve versatility of security device 220.

As further shown in FIG. 4, process 400 may include obtaining, from the client device and based on detecting the suspicious activity, a suspect object (block 420). For example, based on detecting the suspicious activity, security device 220 may obtain one or more suspect objects from client device 210. In some implementations, security device 220 may obtain the one or more suspect objects automatically (e.g., without user input) based on detecting the suspicious activity. Security device 220, or another device, may test the one or more suspect objects to determine whether, for example, any of the one or more suspect objects is a malicious object.

A suspect object may include a file, such as an executable object (e.g., a Windows executable file, a Windows script file, a batch file, etc.), a text object (e.g., a Microsoft Word document, a plain text file, etc.) a page layout object (e.g. a portable document format file, a picture file, etc.), a compressed object (e.g., a zipped file, a WinRAR compressed archive, etc.), a webpage object (e.g., a hypertext markup language object, etc.), a registry key, or another type of object. In some implementations, the suspect object may include a computer program, program code, an object related to a system process, or the like.

In some implementations, security device 220 may obtain the suspect object from a location likely to include a malicious object. For example, security device 220 may obtain the suspect object from one or more of: a location associated with applications and/or processes configured to initiate on startup of client device 210; a location associated with processes active on client device 210 (e.g., background processes); a location associated with downloaded objects; a location associated with objects related to a web browser; a location associated with objects on a most-recently-used (MRU) list; a location associated with newly installed applications and/or programs; or the like. In some implementations, security device 220 may obtain the suspect object from a location based on a type of the suspicious activity. For example, if the suspicious activity relates to a webpage, security device 220 may obtain the suspect object from a location associated with objects related to a web browser.

In some implementations, security device 220 may obtain the suspect object based on the suspect object being capable of causing client device 210 to perform a suspicious activity. For example, assume that an executable object, when executed, is capable of causing client device 210 to perform a suspicious activity. Assume further that a text object is incapable of causing client device 210 to perform the suspicious activity. Based on detecting the suspicious activity, security device 220 may obtain the executable object and may not obtain the text object (e.g., based on the executable object being capable of causing client device 210 to perform the suspicious activity, and the text object being incapable of causing client device 210 to perform the suspicious activity). In this way, security device 220 may improve relevance of obtained suspect objects, thus reducing a quantity of the obtained suspect objects and improving performance and analysis speed of security device 220 in testing the obtained suspect object.

Security device 220 may obtain the suspect object via a remote management interface, in some implementations. A remote management interface may enable security device 220 to read, locate, and/or obtain objects stored by client device 210. In some implementations, the remote management interface may include a Windows Management Instrumentation (WMI) interface, a PowerShell interface, a file sharing interface, a secure shell (SSH) interface, or the like. By obtaining the suspect object using a remote management interface, security device 220 may reduce a quantity of operations performed by client device 210, which may be useful for an uncooperative and/or commandeered client device 210.

In some implementations, security device 220 may request the suspect object. For example, security device 220 may provide, to client device 210, a request for the suspect object. Client device 210 may locate the suspect object and may provide the suspect object to security device 220 based on the request. In some implementations, the request for the suspect object may specify one or more particular suspect objects to provide, may specify a location (e.g., a file, a directory, etc.) from which to provide all objects, or the like. In some implementations, client device 210 may determine the suspect object (e.g., based on a set of rules provided by a network administrator via administrator device 250, by security device 220, etc.). In this way, security device 220 may cause client device 210 to locate and/or provide suspect objects, which may reduce processor and memory requirements for security device 220.

In some implementations, security device 220 may filter objects when obtaining the suspect objects. For example, security device 220 may filter objects that are known not to be malicious, such as objects associated with an operating system of client device 210, objects previously tested by security device 220, objects known to be associated with non-malicious programs, or the like. In some implementations, client device 210 may filter the suspect objects. In this way, client device 210 and/or security device 220 may filter objects that are known not to be malicious, which may conserve resources when testing suspect objects.

As further shown in FIG. 4, process 400 may include determining whether the suspect object is malicious (block 430). For example, security device 220 may determine whether the suspect object is malicious. In some implementations, security device 220 may determine whether multiple suspect objects are malicious. Security device 220 may determine whether the suspect object are malicious based on testing the suspect object, looking up the suspect object in a database of malicious objects, providing the suspect object to another device for testing, or the like.

In some implementations, security device 220 may determine whether the suspect object is malicious by testing the object in a sandbox environment. A sandbox environment may refer to a computing environment that may be used to test for malware. For example, a sandbox environment may be used to execute untested code, untrusted software (e.g., from unverified third parties), or the like. A sandbox environment may provide a tightly controlled set of resources for executing an object without permitting the object to harm a device that hosts the sandbox environment. For example, the sandbox environment may restrict access provided to the object (e.g., may restrict network access, access to inspect a host system, read and/or write access, etc.) to prevent harm to the host device. In some implementations, the sandbox environment may be configured to resemble a system configuration of client device 210 (e.g., to include the same or similar resources, such as an operating system, an amount and/or type of memory, a processor, etc.).

Additionally, or alternatively, security device 220 may determine whether the suspect object is malicious by reading contents of the suspect object, by referencing a list of malicious objects, by providing the suspect object to another device (e.g., for sandbox testing analysis, etc.), or the like.

As further shown in FIG. 4, process 400 may include performing an action based on whether the suspect object is malicious (block 440). For example, security device 220 may determine that the suspect object is malicious, and may perform an action and/or cause another device to perform an action based on determining that the suspect object is malicious (e.g., may block network traffic associated with the suspicious action, may quarantine client device 210, may monitor network traffic flowing to and/or from client device 210, etc.). As another example, security device 220 may determine that the suspect object is not malicious, and may perform an action and/or cause another device to perform an action based on determining that the suspect object is not malicious.

In some implementations, security device 220 may cause client device 210 to perform an action based on determining whether the suspect object is malicious. For example, security device 220 and/or administrator device 250 may cause client device 210 to provide a notification to a user of client device 210, to quarantine a malicious object, to delete a malicious object, to run malware remediation software or the like. Additionally, or alternatively, security device 220 may cause multiple client devices 210 to perform one or more actions. For example, assume that a first client device 210 locally stores a malicious object in a particular file. Security device 220 may cause a second client device 210 to search a version of the particular file and/or other, similar files local to the second client device 210, to determine whether the second client device 210 stores the malicious object. In this way, security device 220 may cause multiple client devices 210 to search for a malicious object, which may more effectively prevent the malicious object from spreading to client devices 210 within customer network 230.

In some implementations, security device 220 may store and/or provide information based on determining whether the suspect object is malicious. For example, security device 220 may store information indicating that the suspect object is malicious, may notify administrator device 250 that the suspect object is malicious, may notify other client devices 210 that a suspect object stored by a first client device 210 is malicious, or the like. In some implementations, security device 220 may provide the suspect object to another device (e.g., a server for analysis, for storage, or for another reason). In some implementations, security device 220 may update a list of malicious object, a list of sources of malicious objects, or the like. Security device 22 may use the list of malicious objects and/or the list of sources of malicious objects to improve malicious object detection algorithms.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
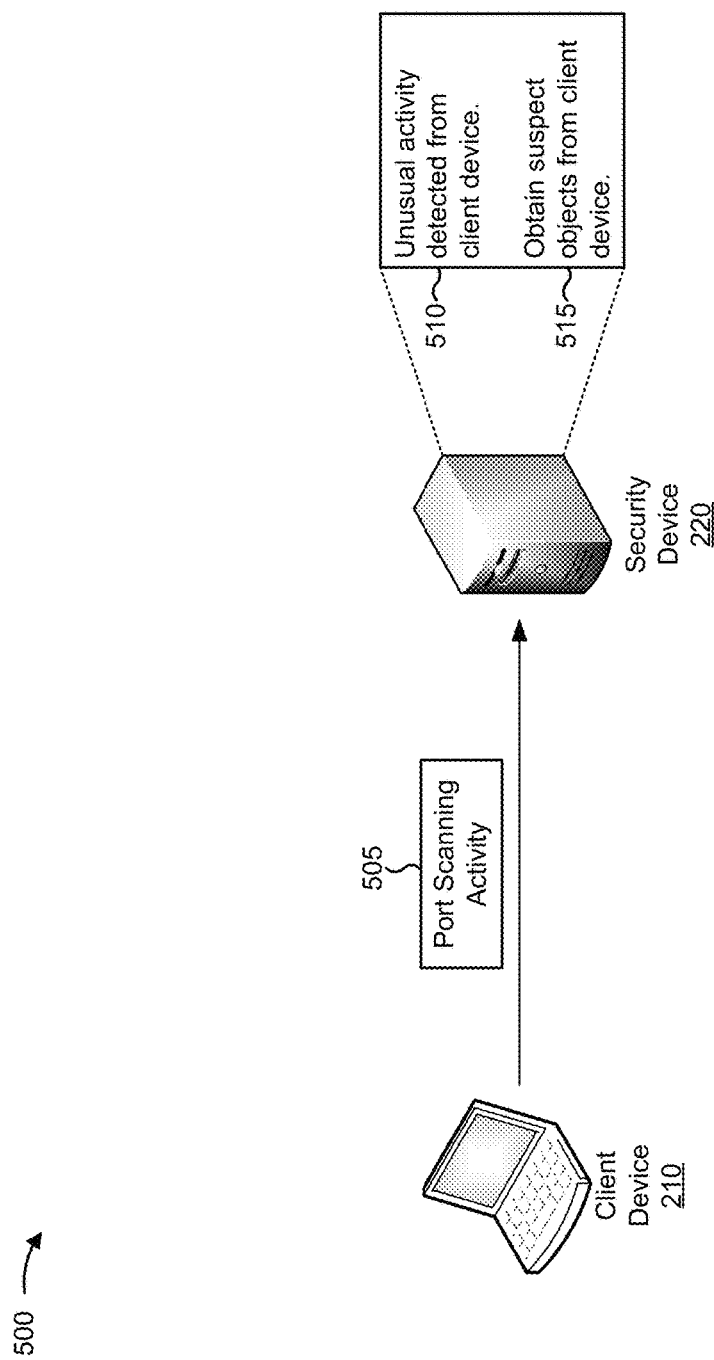
FIGS. 5A-5C are diagrams of an example implementation relating to the example process shown in FIG. 4.
Figure 5B:
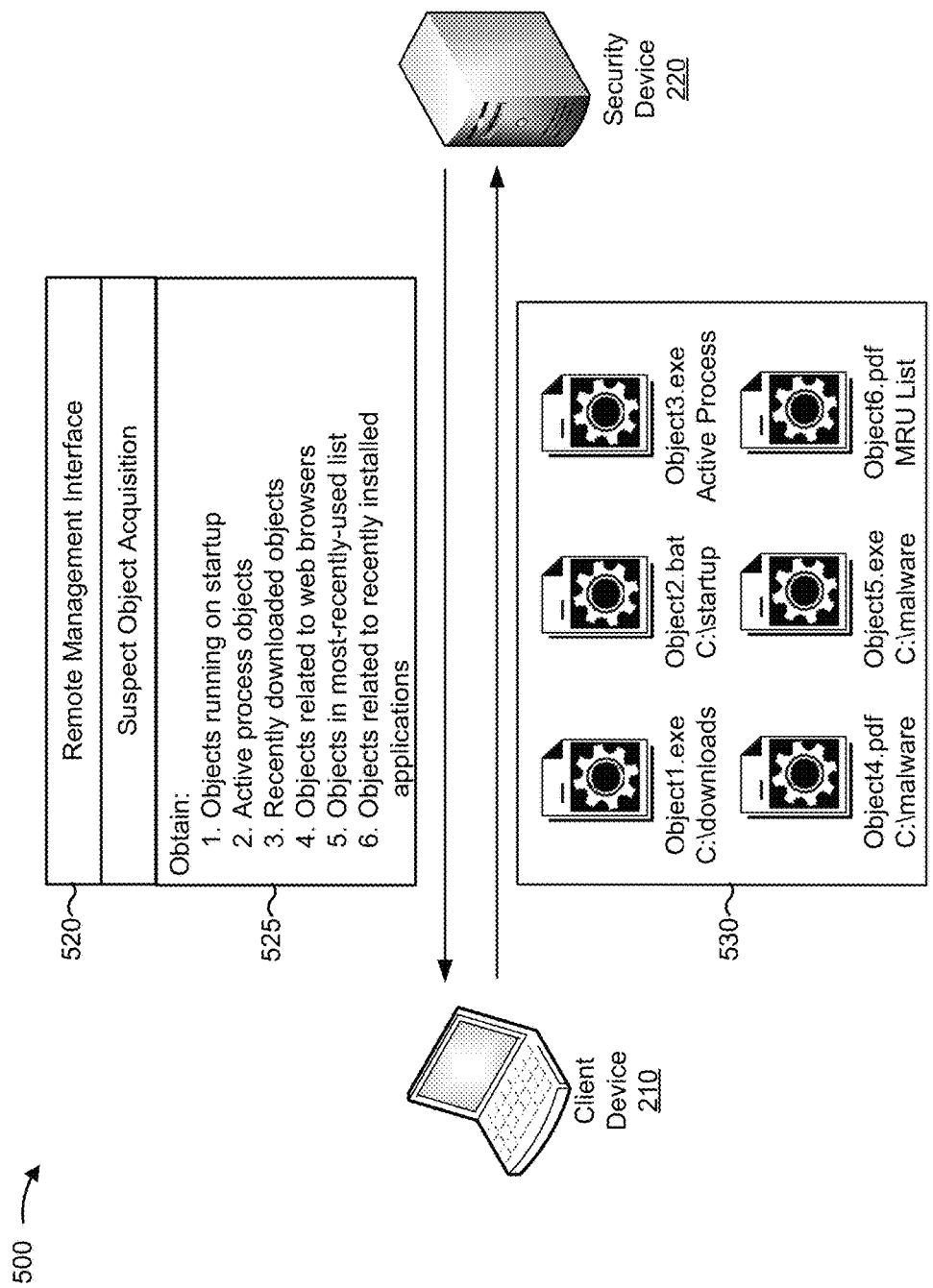
Figure 5C:
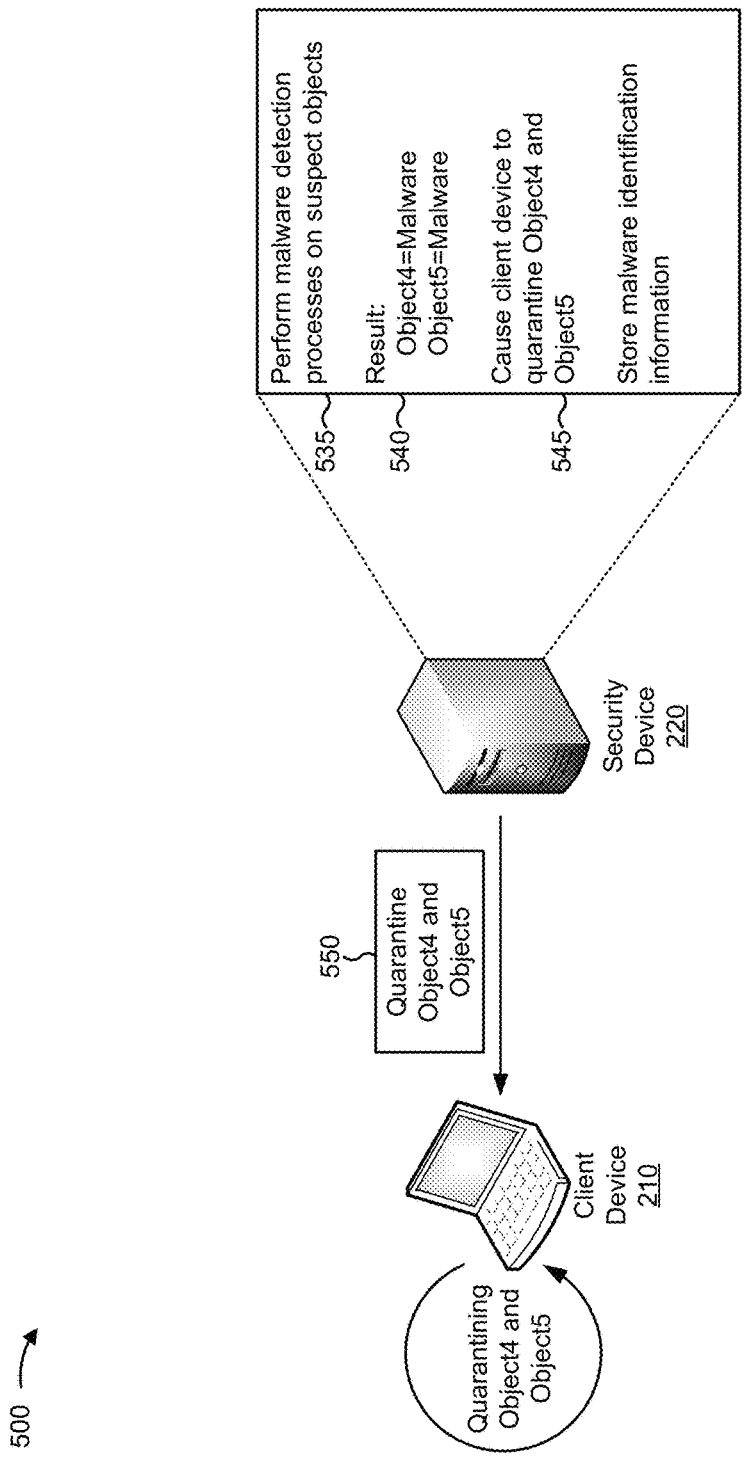

FIGS. 5A-5C are diagrams of an example implementation 500 relating to example process 400 shown in FIG. 4. FIGS. 5A-5C show an example of obtaining and/or testing suspect objects based on detecting suspicious activity.

As shown in FIG. 5A, and by reference number 505, client device 210 performs a suspicious activity. Here, assume the suspicious activity is a port scanning activity. As shown by reference number 510, security device 220 may detect the suspicious activity. As shown by reference number 515, based on detecting the suspicious activity, security device 220 may determine to obtain suspect objects from client device 210, as described in more detail in connection with FIG. 5B. Assume that security device 220 obtains the suspect objects based on detecting the suspicious activity.

As shown in FIG. 5B, and by reference number 520, security device 220 may communicate with client device 210 via a remote management interface. In some implementations, the remote management interface may enable security device 220 to locate and/or obtain the suspect objects stored by client device 210. As shown by reference number 525, security device 220 may obtain objects that are active on startup (e.g., startup of client device 210), objects related to active processes, recently downloaded objects, objects related to web browsers, objects in a most-recently-used list, and objects related to recently installed applications.

As shown by reference number 530, assume that security device 220 obtains six suspect objects and information associated with each of the six suspect objects. Here, security device 220 obtains Object1.exe which is associated with a location of C:\downloads, Object2.bat which is associated with a location of C:\startup, Object3.exe which is associated with an active process, Object4.pdf which is associated with a location of C:\malware, Object5.exe which is associated with the location of C:\malware, and Object6.pdf which is associated with a most-recently-updated list.

As shown in FIG. 5C, and by reference number 535, security device 220 may perform a malware detection process on the six suspect objects to determine whether one or more of the six suspect objects are associated with malware. As shown by reference number 540, security device 220 may determine that Object4 and Object5 are associated with malware. As shown by reference number 545, security device 220 may perform one or more actions based on determining that Object4 and Object5 are associated with malware. Here, security device 220 determines to cause client device 210 to quarantine Object4 and Object5, and stores malware identification information. Assume that the malware identification information identifies Object4 and Object5 as associated with malware. As shown by reference number 550, security device 220 may cause client device 210 to quarantine Object4 and Object5.

As indicated above, FIGS. 5A-5C are provided merely as an example. Other examples are possible and may differ from what was described with regard to FIGS. 5A-5C.

Implementations described herein may enable a security device to obtain suspect objects from a client device based on detecting suspicious activity related to the client device. The security device may determine whether the suspect objects are malicious, and may perform an action based on whether the suspect objects are malicious. In this way, the security device may reduce an amount of work required of a network administrator and/or an information technology agent, may improve network security, and may more effectively police network rules.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   a memory to store instructions; and
   one or more processors to execute the instructions to:
   detect a suspicious activity;
   automatically obtain a suspect object from a first client device, of a plurality of client devices, that is associated with the suspicious activity and based on detecting the suspicious activity,
   the suspect object being an object that is associated with the suspicious activity;
   determine that the suspect object is malicious;
   cause, based on determining that the suspect object is malicious, a second client device, of the plurality of client devices, to determine whether the second client device stores the suspect object; and
   monitor, based on determining that the second client device stores the suspect object, network traffic related to the second client device.

2. The device of claim 1, where the one or more processors, when automatically obtaining the suspect object, are further to:
   obtain the suspect object from at least one of:
   a location associated with applications or processes configured to initiate on startup of the first client device,
   a location associated with processes active on the first client device,
   a location associated with downloaded objects on the first client device,
   a location associated with objects related to a web browser of the first client device,
   a location associated with objects on a most-recently-used list of the first client device, or
   a location associated with newly installed applications on the first client device.

3. The device of claim 1, where the one or more processors, when automatically obtaining the suspect object, are further to:
   locate the suspect object on the first client device using a remote management interface with the first client device.

4. The device of claim 1, where the one or more processors obtain the suspect object based on the suspect object being capable of causing the first client device to perform the suspicious activity.

5. The device of claim 1, where the one or more processors, are further to:
   determine whether the suspect object is a safe object,
   the safe object including at least one of an object related to
   an operating system of the first client device,
   an object previously determined by the device to be non-malicious, or
   an object associated with a non-malicious application; and
   obtain, or exclude from obtaining, the suspect object based on determining whether the suspect object is the safe object.

6. The device of claim 1,
   where the one or more processors are further to:
   perform an action based on determining that the suspect object is malicious, and where the action includes at least one of:
   quarantining the first client device,
   causing the first client device to quarantine the suspect object,
   causing the first client device to provide information to a user of the first client device,
   storing information identifying the suspect object,
   providing information to a network administrator, or
   blocking the suspicious activity.

7. The device of claim 1,
   where the one or more processors are further to:

identify a location of the suspect object on the first client device, and where the second client device determines whether the second client device stores the suspect object based on the suspect object being associated with the suspicious activity and based on the location of the suspect object on the first client device.

8. A non-transitory computer-readable medium storing instructions, the instructions comprising:
one or more instructions that, when executed by one or more processors of a device, cause the one or more processors to:
detect a suspicious activity associated with a first client device, of a plurality of client devices;
automatically obtain, from the first client device and based on detecting the suspicious activity, one or more suspect objects,
the one or more suspect objects being objects that are capable of causing the suspicious activity;
determine that a suspect object, of the one or more suspect objects, is associated with the suspicious activity;
cause, based on determining that the suspect object is associated with the suspicious activity, a second client device, of the plurality of client devices, to determine whether the second client device stores the suspect object; and
monitor, based on determining that the second client device stores the suspect object, network traffic related to the second client device.

9. The non-transitory computer-readable medium of claim 8, where the one or more instructions, that cause the one or more processors to obtain the one or more suspect objects, further cause the one or more processors to:
obtain the one or more suspect objects from at least one of:
a location associated with applications or processes configured to initiate on startup of the first client device,
a location associated with processes active on the first client device,
a location associated with downloaded objects on the first client device,
a location associated with objects related to a web browser of the first client device,
a location associated with objects on a most-recently-used list of the first client device,
or
a location associated with newly installed applications on the first client device.

10. The non-transitory computer-readable medium of claim 8, where the one or more instructions further cause the one or more processors to:
determine whether the one or more suspect objects are safe objects,
the safe objects including at least one of an object related to an operating system of the first client device, an object previously obtained by the device, or an object associated with a non-malicious application; and
obtain, or exclude from obtaining, the one or more suspect objects based on determining whether the one or more suspect objects are the safe objects.

11. The non-transitory computer-readable medium of claim 8, where the one or more instructions further cause the one or more processors to:

cause the first client device to identify the one or more suspect objects; and
cause the first client device to provide the one or more suspect objects.

12. The non-transitory computer-readable medium of claim 8, where the one or more instructions further cause the one or more processors to:
perform an action based on determining that the suspect object is malicious, and where the action includes at least one of:
quarantining the first client device,
causing the first client device to quarantine one or more of the one or more suspect objects,
causing the first client device to provide information to a user of the first client device,
storing information identifying the one or more suspect objects,
providing information to a network administrator, or
blocking the suspicious activity.

13. The non-transitory computer-readable medium of claim 8,
where the one or more instructions further cause the one or more processors to:
identify a location of the suspect object on the first client device; and
where the second client device determines whether the second client device stores the suspect object based on the suspect object being associated with the suspicious activity and based on the location of the suspect object on the first client device.

14. The non-transitory computer-readable medium of claim 8, where the one or more instructions further cause the one or more processors to:
locate the one or more suspect objects on the first client device using a remote management interface with the first client device.

15. A method, comprising:
detecting, by a device, a suspicious activity;
automatically obtaining, by the device and based on detecting the suspicious activity, a suspect object,
the suspect object being obtained from a first client device, of a plurality of client devices, that is associated with the suspicious activity, and
the suspect object being an object that is associated with the suspicious activity;
determining, by the device, that the suspect object is malicious;
causing, by the device and based on determining that the suspect object is associated with the suspicious activity, a second client device, of the plurality of client devices, to determine
whether the second client device stores the suspect object; and
monitoring, by the device and based on determining that the second client device stores the suspect object, network traffic related to the second client device.

16. The method of claim 15, further comprising:
locating the suspect object on the first client device using a remote management interface with the first client device.

17. The method of claim 15, where the device determines that the suspect object is malicious based on at least one of:
testing the suspect object in a sandbox environment,
reading contents of the suspect object, or
referencing a list of malicious objects.

18. The method of claim 15, where automatically obtaining the suspect object further comprises:

obtaining the suspect object from at least one of:
- a location associated with applications or processes configured to initiate on startup of the first client device,
- a location associated with processes active on the first client device,
- a location associated with downloaded objects on the first client device,
- a location associated with objects related to a web browser of the first client device,
- a location associated with objects on a most-recently-used list of the first client device, or
- a location associated with newly installed applications on the first client device.

19. The method of claim 15, further comprising:
determining whether the suspect object is a safe object,
   the safe object being at least one of an object related to an operating system of the first client device, an object previously obtained by the device, or an object associated with anon-malicious application; and
obtaining, or excluding from obtaining, the suspect object based on determining whether the suspect object is the safe object.

20. The method of claim 15, where automatically obtaining the suspect object further comprises:
obtaining the suspect object based on the suspect object being capable of causing the first client device to perform the suspicious activity.

* * * * *